United States Patent Office 3,205,907
Patented Sept. 14, 1965

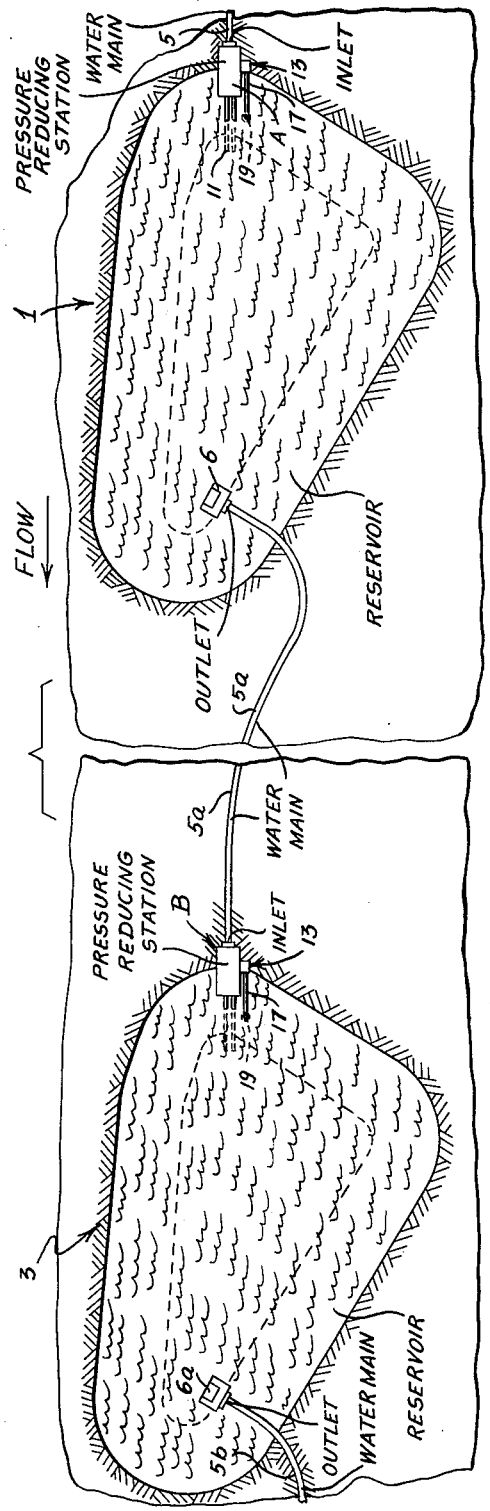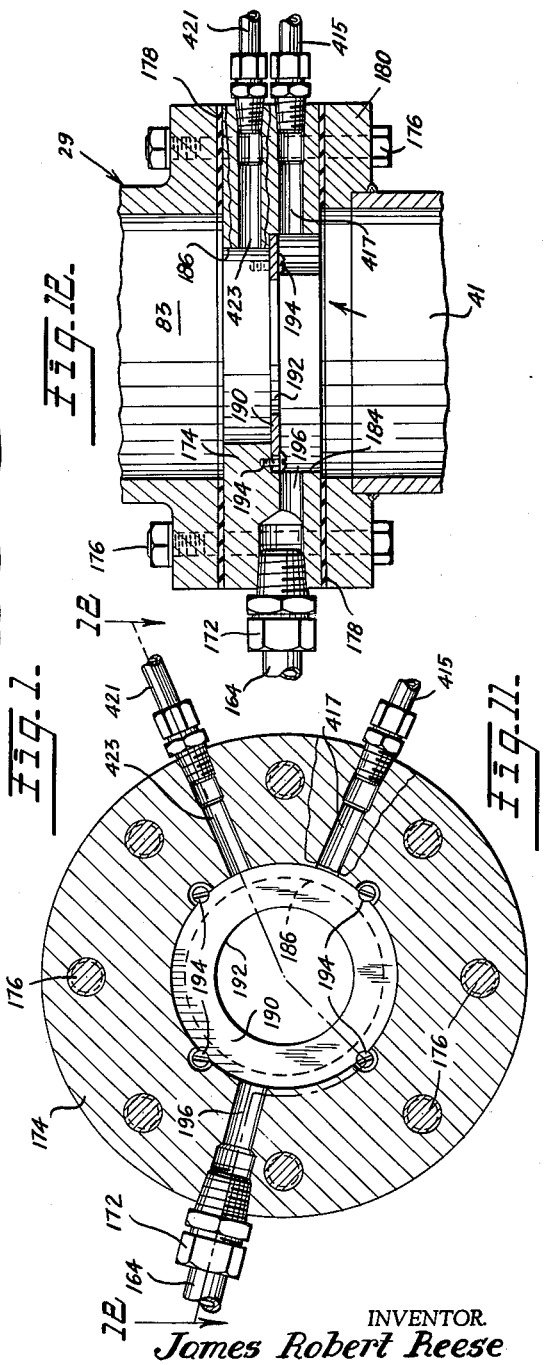

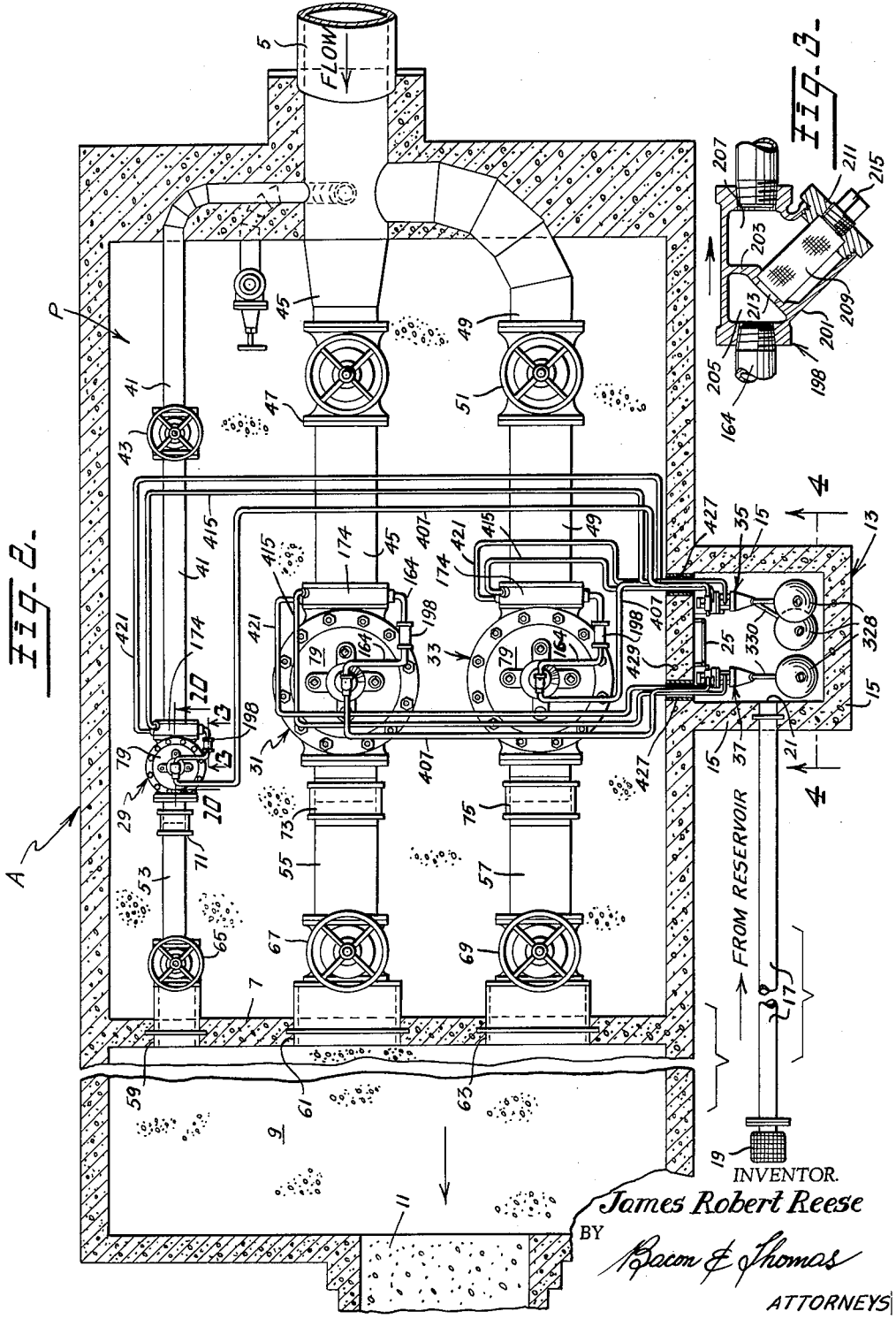

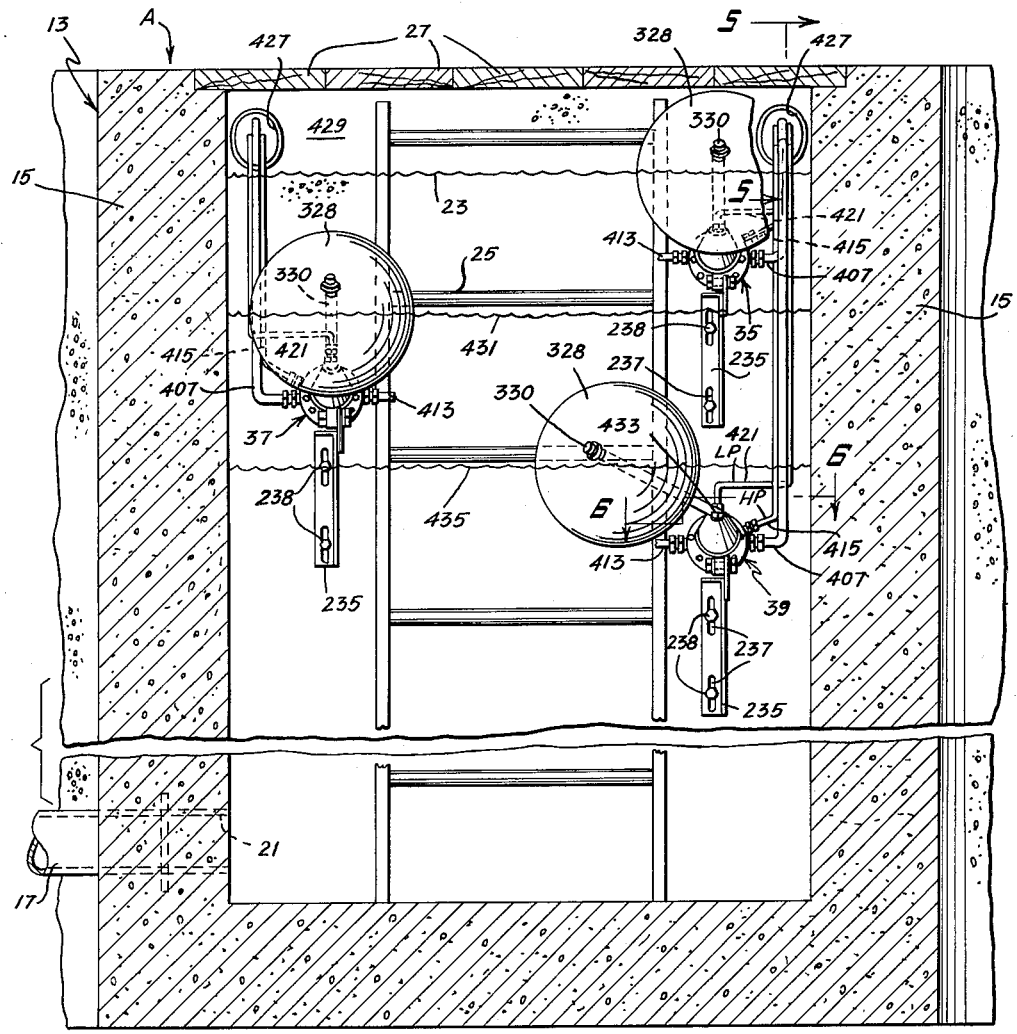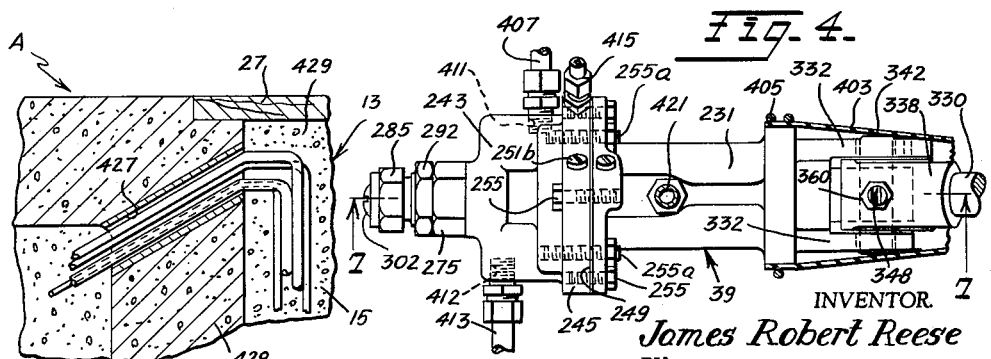

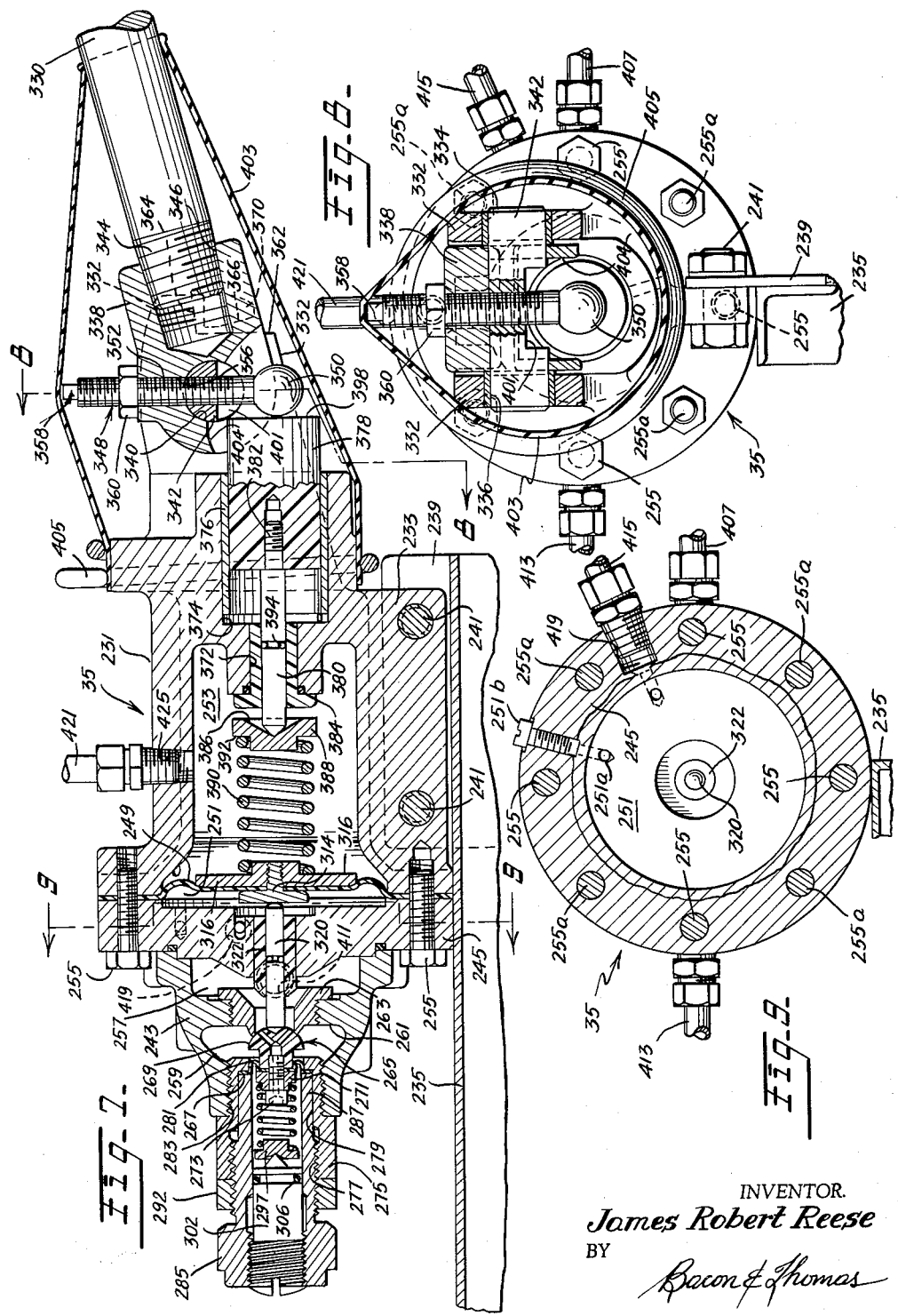

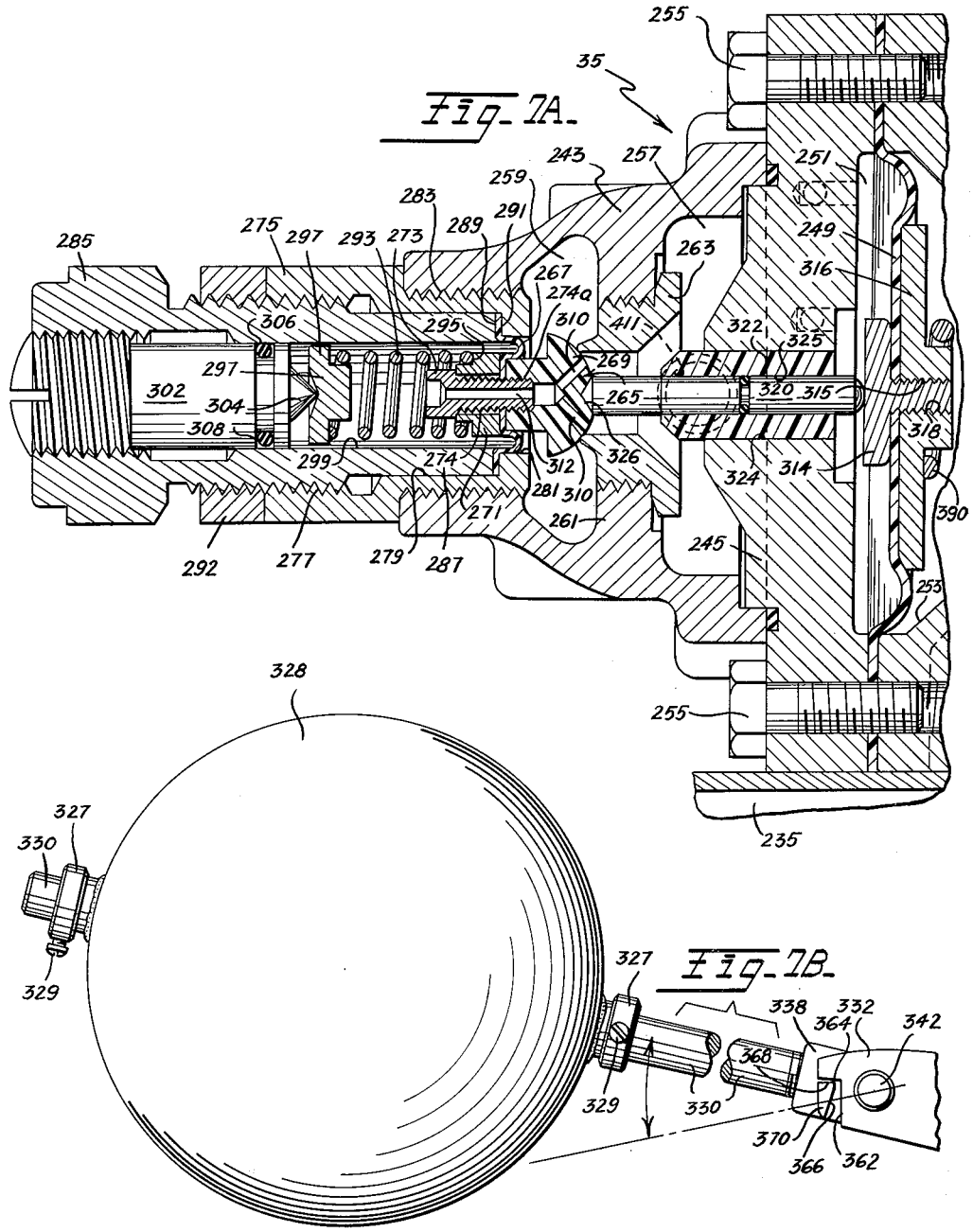

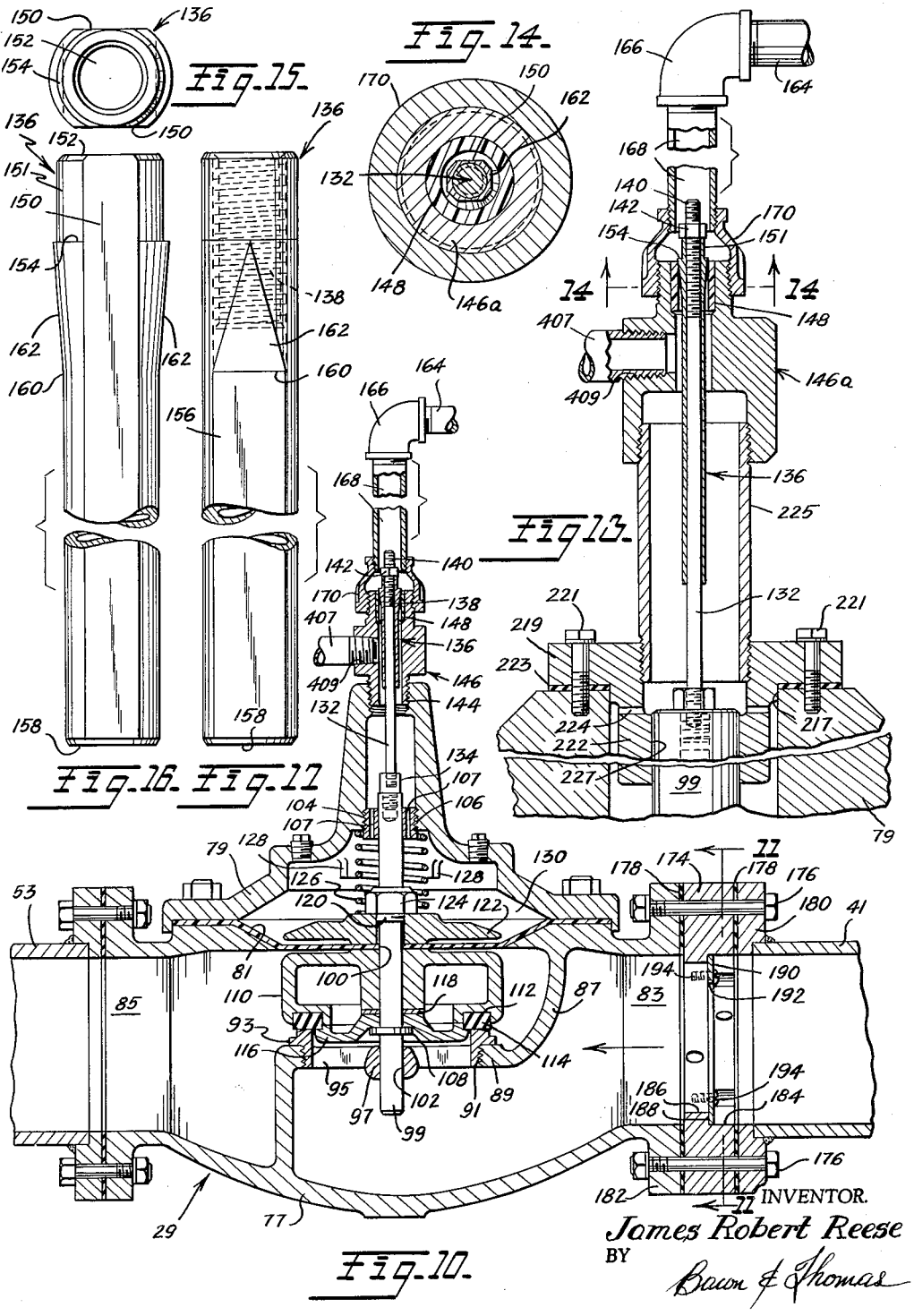

3,205,907
COMBINATION RATE-OF-FLOW AND MODULATING FLOW-CONTROLLED VALVE AND WATER SYSTEM
James Robert Reese, Santa Ana, Calif., assignor to Donald G. Griswold, Newport Beach, Calif.
Filed Jan. 21, 1963, Ser. No. 252,936
16 Claims. (Cl. 137—389)

The present invention relates to a combination rate-of-flow and modulating main valve controlled by a float-operated control valve, adapted to be used singly, or in multiple, to maintain a desired water level in a water supply system, such as a reservoir and/or to maintain a desired water level in a water distribution system comprising a plurality of reservoirs connected in series, and wherein the flow of water from one reservoir to another is automatically controlled by one or more of the main valves and controls of the present invention.

More particularly, each reservoir or water storage area is provided with a pressure reducing station comprising a pit containing one or more valves which control the flow of water into the reservoir to maintain the desired level therein. Each pressure reducing station has a sump well associated therewith, the sump well being in communication with the reservoir and having a liquid level therein corresponding to that existing in the reservoir. The sump well contains one or more float-control valves, one each for controlling a main valve at the pressure reducing station. The main valves are hydraulically operated by operating fluid derived from the upstream side thereof, and each control valve is connected with its main valve by tubing arranged so that the control valve can permit continuous bleeding of operating fluid from the main valve to permit the main valve to remain open, or to modulate, or to prevent the flow of operating fluid from the main valve, thereby causing pressure to build up in the main valve to effect closing thereof. The float-operated control or pilot valve is, in effect, a remote control valve, so that the pressure reducing station can be located a substantial distance from the sump well.

The float-operated control valves are installed in the sump well at different heights and are thus responsive to different water levels to successively open the main valves, so that if the flow through a first main valve is inadequate to restore the desired level in the reservoir, a second, or even a third main valve will be opened. The main valves may be of different sizes to provide different flow rates.

Each float-actuated control valve, in addition to being responsive to the water level in the sump well, is designed so that it is also responsive to the differential pressure across an orifice plate disposed at the inlet side of its associated main valve, so that the operation of the main valve is also controlled in accordance with the rate of flow of water through the main valve. Each control valve also includes means that is adjustable to vary the rate of flow of operating fluid therethrough for a given movement of the float.

An important feature of the main valves of the present invention is that they include a stem having a restricter or dampening valve associated therewith in a manner to control the rate of closing of the main valve, whereby to prevent surges or hammering in the upstream pipeline. In this connection, the restricter is further designed so that it will not flutter and produce noise during the closing operation of the main valve and after the main valve has been closed.

The invention further relates to a system for conducting water from a source at a high elevation, through a series of pressure reducing stations, to successively lower elevations, and more particularly to float-actuated control valves employed in the system for closely governing and modulating the rate of flow of the water at each station.

It is desirable to provide pressure reducing stations in water conducting and distribution systems whenever the difference in elevation from the source, such as a dam, to the lower end of the system, is more than a few hundred feet, in order to avoid excessive head pressures and to prevent line surges, which could cause valve or pipeline rupture.

In the system specifically disclosed by way of example in this application, a series of pressure reducing stations is provided to reduce the head pressure of the water being conducted, to atmospheric pressure at each station. These pressure reducing stations are preferably incorporated in the system at each change in elevation of approximately 100 feet, or as otherwise found to be convenient or necessary. Each pressure reducing station includes the automatic valves to govern the rate of discharge of the water from the water main into the reservoir, and a sump well for the float-actuated control valves, as mentioned hereinabove.

Accordingly, the principal object of the invention is to provide a combined rate-of-flow and modulating main valve controlled by a float-actuated and pressure differential responsive control valve for governing the rate of flow of water through the main valve to automatically maintain a desired liquid level in a reservoir, within close limits. Another object is to provide a float-actuated control valve, which is responsive to the level of liquid in a reservoir and which is also responsive to the pressure differential across an orifice plate at the inlet of the main valve associated with said control valve.

Another object is to provide a float-actuated control valve in which the float arm is movable angularly between predetermined upper and lower limits, and wherein means is provided that is adjustable independently of the float arm for varying the extent of movement of the valve for any given predetermined angular movement of the float arm.

Still another object is to provide a main valve and a float-actuated control valve therefor wherein the actuation of both valves is modulated in accordance with pressure variations on the upstream side of the main valve.

A further object is to provide means that will govern the closing action of a hydraulically operated main valve without causing hammering or line shock and which will operate silently without fluttering.

A still further object is to provide a water supply system wherein the liquid level in reservoirs at different elevations is automatically maintained, and wherein flow from high to lower reservoirs is effected automatically without danger of damage to the interconnecting water mains and flow control equipment.

These and other objects and advantages of the invention will become more apparent from the following description when taken in conjunction with the accompanying drawings, in which:

FIG. 1 is a schematic plan view of a portion of a water storage and supply system comprising two reservoirs, each having a pressure reducing station associated therewith;

FIG. 2 is an enlarged, fragmentary, horizontal sectional view through one of the pressure reducing stations, showing the main valves and the float-actuated control valves therefor;

FIG. 3 is an enlarged sectional view through a strainer, which is connected in the pipe supplying operating fluid to a main valve, taken on line 3—3 of FIG. 2;

FIG. 4 is an enlarged, fragmentary, vertical sectional view through a sump well, taken on the line 4—4 of FIG. 2;

FIG. 5 is an enlarged, fragmentary, vertical sectional view taken on the line 5—5 of FIG. 4 showing one of the openings in the pit wall for the tubing which connects a main valve with its control valve;

FIG. 6 is an enlarged, fragmentary, plan view of one of the float-actuated control valves, taken on the line 6—6 of FIG. 4;

FIG. 7 is an enlarged, fragmentary, vertical sectional view through the float-actuated control valve, taken on the line 7—7 of FIG. 6;

FIG. 7A is a further enlarged fragmentary vertical sectional view of the left end portion of the float-actuated control valve;

FIG. 7B is an enlarged fragmentary side elevational view taken from the rear of the right end of the float-actuated control valve, and particularly illustrating the means for limiting the angular movement of the float carrying arm;

FIG. 8 is a vertical, sectional view through the adjusting means associated with the float arm for varying the operation of the valve element controlled thereby, taken on the line 8—8 of FIG. 7;

FIG. 9 is a vertical sectional view through the float-actuated valve, taken on the line 9—9 of FIG. 7;

FIG. 10 is an enlarged vertical sectional view through one of the main valves, taken on the line 10—10 of FIG. 2;

FIG. 11 is an enlarged vertical sectional view through an orifice plate holder mounted at the inlet of a main valve, taken on the line 11—11 of FIG. 10;

FIG. 12 is a staggered, fragmentary horizontal sectional view through the orifice plate holder, taken on the line 12—12 of FIG. 11;

FIG. 13 is an enlarged, fragmentary vertical sectional view showing the restricter or closing rate control means mounted on the upper portion of a modified form of main valve;

FIG. 14 is an enlarged, horizontal sectional view, taken on the line 14—14 of FIG. 13; and FIGS. 15, 16 and 17 are enlarged top, end, and side views, respectively, of a restricter, or dampening valve attached to the valve stem of the main valve shown in FIG. 10.

FIG. 1 schematically shows two reservoirs 1 and 3 located at different elevations in a water storing and distribution system with the reservoir 1 disposed at a higher elevation than the reservoir 3. Water from another reservoir or other source (not shown), located at a higher elevation than reservoir 1 is supplied to reservoir 1 through a large water main 5. The flow of water from the main 5 into the reservoir 1 is controlled by valve means located at a pressure reducing station A to maintain the water level in the reservoir 1 substantially constant and within predetermined upper and lower limits. A protected outlet 6 in reservoir 1 is connected to a pressure reducing station B at the reservoir 3 by an interconnecting water main 5a. Here again, the water flowing from the water main 5a into the reservoir 3 is controlled by valve means located at the pressure reducing station B to maintain the water level in the reservoir 3 substantially constant. A protected outlet 6a in the reservoir 3 is connected to an outlet water main 5b that may lead to a source of use, or to another reservoir at a lower level.

As many pressure reducing stations and reservoirs as are found to be necessary may be employed in the system to avoid excessive head pressure and to reduce or substantially eliminate line surges or water hammer, which could cause serious damage. Since all of the pressure reducing stations in the system are substantially alike, a description of the structure and mode of operation of one station will be adequate for all.

The general layout of the pressure reducing station A is illustrated in plan view in FIG. 2, and comprises a generally rectangular-shaped pit P, formed from reinforced concrete. Suitable cover means provided with an access opening (not shown) leading into the interior of the station may be provided.

A water impervious concrete partition 7 extends across the interior of the pressure reducing station A adjacent one end thereof and provides a discharge well 9 connected with the reservoir 1 by a discharge conduit 11. A sump well 13, having water impervious walls 15, is conveniently formed at one side of the pressure reducing station A at a point approximately midway between the ends thereof. The sump well 13 is connnected to the reservoir by a four inch pipeline 17, with the pipe being disposed substantially horizontally or inclined slightly downwardly from the sump well 13 into the reservoir 1. The end of the pipeline 17 which is submerged in the reservoir 1 is provided with a strainer 19. The outside of the other end of the pipeline 17 is sealed in an opening 21 formed in the lower portion of the wall 15 of the sump well 13.

The sump well 13 is constructed at such an elevation that the highest level of the water to be maintained in the reservoir 1 will be at an elevation substantially below the upper portion of the sump well. The water in the reservoir 1 is free to flow into the sump well 13 through the pipeline 17, so that the water level in the sump well will always be at a level coinciding with that in the reservoir. As is shown in FIG. 4, the maximum upper limit permissible for the water level in the reservoir 1, as reflected in sump well 13, is indicated by the line 23. At this high water level 23, all flow of water through the water main 5 is shut off. As the water level in the reservoir drops to a given level below the high water level 23, flow is permitted through the water main 5 to restore the orginal level and thus maintain the water level in the reservoir substantially constant, as will be explained hereinafter. A metal ladder 25 is attached to a wall of the sump well 13, and planks 27, or other suitable closure means, is provided to cover the sump well.

The flow of water from the water main 5 to the discharge well 9, and thence into the reservoir 1 through discharge conduit 11, is controlled as required by one or more valves. For example, one six inch automatic valve 29, and a pair of sixteen inch automatic valves 31 and 33. The opening and closing of the valves 29, 31 and 33 is controlled by float-actuated pilot or control valves 35, 37 and 39, respectively, suitably mounted at different levels in the sump well 13. The level of the liquid in the reservoir 1 is normally maintained between prescribed levels by the flow through the six inch valve 29. In the event that the six inch valve 29 cannot maintain the water level within predetermined limits, the water level in the sump well 13 will be lowered sufficiently to actuate the float control valve 37, thus opening the sixteen inch valve 31 to augment the flow of water into the reservoir 1 from the six inch valve 29. Should the level of the water be lowered a still further predetermined distance, float-actuated control valve 39 will open the sixteen inch valve 33 to augment the flow of water into the reservoir through the six inch valve 29 and the sixteen inch valve 31.

The water flows from the main 5 to the valve 29 through a pipe 41, having a manually operable gate valve 43 disposed therein. The flow of water from the main 5 to the valve 31 is through a pipe 45, and a manually operable gate valve 47 disposed therein; while the flow of water from the main 5 to the valve 33 is through a pipe 49 having a manually operable gate valve 51 disposed therein. The discharge side of the valves 29, 31 and 33 is connected to one end of pipes 53, 55 and 57, respectively. The outside of the other end of pipes 53, 55 and 57, which discharge into the well 9, is sealed in openings 59, 61 and 63, respectively, formed in the partition 7 with the flow through pipes 53, 55 and 57 being controlled by manually operable gate valves 65, 67 and 69, respectively. Couplings 71, 73 and 75 are employed to conveniently connect sections of each of pipes 53, 55 and 57 together.

The six inch valve 29 is illustrated in cross-section in FIG. 10 and is constructed in all major respects substantially the same as the sixteen inch valves 31 and 33. The only difference between the six inch valve 29 and the sixteen inch valves 31 and 33 lies in the modification of the upper portion of the housing of valves 31 and 33, and in the details of the restricter or dampening valve means associated therewith, as will be more fully described later. Each of the main valves 29, 31 and 33 includes a body 77, a cover 79 for the body, and a flexible diaphragm 81 disposed intermediate the body and the cover. The body 77 is provided with an inlet chamber 83 and an outlet chamber 85 separated by a partition 87. Partition 87 includes a horizontal wall 89 provided with a threaded opening 91, in which is mounted a threaded valve seat 93 having inwardly directed radial arms 95 connected to a centrally disposed hub 97.

A valve stem 99, which passes through an opening 100 provided in the center of the diaphragm 81, is disposed with the lower end thereof slidably mounted in opening 102 formed in a hub 97, and with the upper end thereof slidably mounted in a threaded bushing 104 disposed in a threaded opening 106 formed in the cover 79. The threaded bushing 104 is provided with a series of passages 107 extending therethrough for the flow of operating fluid under pressure therethrough.

The lower end of the valve stem 99 carries an annular flange 108. A chambered member 110, having an annular recess 112 in the lower face thereof, is mounted on the valve stem 99 immediately beneath the diaphragm 81. An annular, resilient valve element 114, adapted to cooperate with the valve seat 93, is received in an annular recess 112 in the chambered member 110 and is maintained therein by a washer 116 mounted on the valve stem 99 between said chambered member and the annular flange 108. The washer 116 is smaller in diameter than the opening in valve seat 93 and is partially received therein when the valve element 114 is in closed position. The lower face of the valve element 114 extends radially inwardly beyond the opening in valve seat 93, and is engaged by the washer 116 and held thereby in the annular recess 112. A spacing washer 118 is positioned on the valve stem 99 between the chambered member 110 and the washer 116.

The valve stem 99 is provided with a threaded portion 120 spaced a short distance above the diaphragm 81. A clamping washer 122 is mounted on the valve stem 99 immediately above the diaphragm 81, and a nut 124 is screwed downwardly on the threads 120 and cooperates with the flange 108 to secure the washer 122, the diaphragm 81, the chambered member 110, the valve element 114 and the washer 116 in assembled relation with the valve stem 99. Valve stem 99 is normally urged downwardly by a compression spring 126 surrounding the upper portion of the stem and bearing at one end on the upper surface of clamping washer 122 and at the other end on a shoulder formed in the cover 79 surrounding the threaded bushing 104. Upward movement of the valve stem 99 is limited by abutments 128 formed on the inner surface of the cover 79, which engage with the upper face of the washer 122. The cover 79 and diaphragm 81 cooperate to provide a pressure chamber 130 for operating fluid under pressure for effecting closing of the valve. The valve 29 is hydraulically actuated by conducting operating fluid (water) under pressure to the chamber 130 from the supply pipe 41, and by controlling the supply and exhaust of such fluid by the float-actuated control valve 35. The rate at which the valve 29 will close is governed by the valve stem 99 which carries an upwardly directed stem extension 132, rigidly secured at the lower end thereof to the upper end of valve stem 99 by an adapter or coupling 134. A tubular dampening or restricter valve member 136, having threads 138 on the inner wall at the upper end thereof, is telescoped over the upper end of the valve stem extension 132, and is adjustably mounted thereon for vertical movement on threads 140 formed on the upper end of the valve stem extension 132. A lock nut 142 is threaded onto the upper end of the valve stem extension 132 and jams against the upper end of the tubular valve member 136 to maintain the same in adjusted position thereon.

The cover 79 has a threaded opening 144 at the center thereof, into which is threaded a T-shaped fitting 146. A bushing 148, which is press-fitted into the upper end of the fitting 146 and surrounds the upper end of the tubular valve member 136, cooperates with said tubular valve member to restrict the rate of flow of operating fluid to the diaphragm chamber 130.

As is best illustrated in FIGS. 15, 16, and 17, the tubular restricter 136 is provided on opposite sides thereof with parallel flat portions 150, which extend from one end thereof to the other. The upper end of the restricter 136 is reduced in diameter for a short distance, as at 151, from its upper extremity 152 downwardly to a shoulder 154. The lower portion of restricter 136 is provided with parallel flat areas 156 at the opposite sides thereof, extending from the lower extremity 158 of said restricter to a line 160. The flat areas 156 are disposed at right angles to the flat portions 150 and diverge upwardly and outwardly from the line 160, terminating at the shoulder 154 to provide substantially triangular shaped, flow-control and dampening areas 162 on the opposite sides of the restricter for cooperation with the bushing 148. The diameter of the arcuate portions of the restricter 136 at the outer periphery of the shoulder 154 is slightly less than the internal diameter of the cooperating bushing 148.

The restricter 136 can be adjustably positioned vertically on the valve stem extension 132, and is preferably adjusted so that, when the valve 29 is in closed position, the shoulder 154 extends a short distance (about $\frac{1}{16}''$ to $\frac{3}{32}''$) above the upper end of the bushing 148, with a radial clearance of approximately .002" to .004" between the bushing and the restricter. It has been found desirable to form the bushing 148 of a thermoplastic resin such as "Delrin," although any other suitable material can be used. By forming the bushing 148 of "Delrin" and providing a clearance of between .002" and .004" between said bushing and the restricter 136, stem flutter and noise which would otherwise be caused is eliminated when the valve 29 is closed or nearly closed.

A pipe 164, which conducts water under pressure from the pipe 41 to the upper end of the restricter 136, is connected at one end thereof to the upper end of the T-shaped fitting 146 by an elbow 166, a nipple 168 and a reducing coupling 170. The other end of the pipe 164 is connected by a threaded fitting 172 (FIG. 12) to an orifice plate holder 174, mounted between the supply pipe 41 and the inlet chamber 83 of the valve 29. Threaded bolts 176 clamp the orifice plate holder 174, and gaskets 178 positioned on either side thereof, between a flange 180 welded onto the end of the pipe 41 and a flange 182 formed at the inlet opening of the valve body 77 to form a water tight joint.

The orifice plate holder 174 includes a bore 184 separated from a bore 186 of smaller diameter by a radial shoulder 188. An orifice plate 190, having an orifice 192 of smaller diameter than the bore 186 is mounted on the shoulder 188 by screws 194 whose heads engage said plate and whose shanks are threaded into openings in the orifice plate holder 174. The bore 184 communicates with the pipe 164 through a radial passage 196 (FIG. 12) formed in the orifice plate holder 174 on the upstream side of the orifice plate 190.

Since the valve 29 is actuated by water supplied from the pipe 41 to the pressure chamber 130, a strainer 198, best illustrated in FIG. 3, is connected in the pipe 164 between the orifice plate holder 174 and the restricter 136 to prevent foreign matter from entering said pressure chamber. The strainer 198 includes a Y-shaped housing 201 having the interior thereof divided by a partition 203 into an inlet chamber 205 and an outlet chamber 207. A fine mesh screen 209, formed of wire or other suitable material, is secured to a threaded fitting 211, mounted in one leg of the Y-shaped housing 201. The screen 209 is disposed in the outlet chamber 207 and extends inwardly from the fitting 211 into contact with the partition 203, the inner end of the screen surrounding a flow passage 213 formed in said partition. A plug 215 is threaded into the center of the fitting 211 and may be removed to permit flushing of the screen 209 to clean it. The screen 209 may be removed from the outlet chamber 207 by removing the threaded fitting 211.

The sixteen inch automatic valves 31 and 33 function in the same manner as the valve 29, and are similarly constructed, except for the connections and structure mounted immediately above the cover 79, as illustrated in FIGS. 13 and 14. In describing FIGS. 13 and 14, the same numerals will be employed as those used in the description of the six inch valve 29, to identify corresponding parts. Thus, the upper portion of the cover 79 of one of the sixteen inch valves is provided with a centrally disposed opening 217, in which is mounted a flanged fitting 219 secured to the upper surface of the cover 79 by bolts 221, with a gasket 223 positioned between the upper surface of the cover 79 and the lower surface of flanged fitting 219. A skirt portion 222 of the fitting 219 is disposed within cover 79 and has a series of radially extending fluid passages 224 extending therethrough. The reducing coupling 170 is connected to the flanged fitting 219 by a modified T-shaped fitting 146a and a pipe nipple 225. As is the case in the six inch valve 29, the bushing 148, which is mounted in the upper end of modified T-shaped fitting 146a, surrounds the triangular-shaped flow control and dampening areas 162 formed on the outer surface of the restricter 136. The valve stem 99 is lower than that of the six inch valve 29, extends nearly to the upper end of the cover 79, and is slidably mounted in a counterbore 227 formed in the skirt portion 222 of the flanged fitting 219. Therefore, a longer valve stem extension 132 is provided to support the restricter 136 in proper relation to the bushing 148, which is located at a correspondingly greater height due to the presence of the pipe nipple 225 between the T-shaped fitting 146a and the flanged fitting 219.

The valve 29 can be opened, closed or modulated by varying the pressure of the operating fluid in the diaphragm chamber 130. All of the foregoing can be effected by bleeding off more or less of the operating fluid supplied to the diaphragm chamber 130. The operating fluid for actuating the valve 29 normally flows under pressure from the pipe 41, through passage 196 in the orifice plate holder 174, pipe 164, elbow 166, nipple 168, reducing coupling 170, T-shaped fitting 146, along flat portions 150, 162, and 156 of the restricter 136 cooperating with the bushing 148, through passages 107 in the bushing 104 and into the pressure chamber 130 to flex the diaphragm 81 downwardly to close the valve 29. In the sixteen inch valves 31 and 33, the operating fluid is conducted in the same manner to the fitting 146a, then through nipple 225, passages 224 to chamber 130. The valves 29, 31, and 33 will remain closed until the pressure in the chamber 130 is relieved in a manner to be described hereinafter.

The novel float-actuated control valves 35, 37 and 39, located in the sump well 13, control and modulate the operation of the six inch valve 29 and the sixteen inch valves 31 and 33. The structure and principles of operation of the valves 35, 37 and 39 are the same and, therefore, only the float-actuated control valve 35, which is employed in connection with the valve 29, will be described.

The float-actuated control valve 35 (FIG. 7) includes a main housing 231 having an elongated fin 233 extending downwardly therefrom. An angle-iron bracket 235 adjustably mounts the control valve 35 on one wall of the sump well 13. One vertical leg of the bracket 235 is provided with elongated slots 237 (FIG. 4) and is mounted for vertical adjustment on the wall of the sump well 13 by lag screws 238. The other leg of the bracket 235 extends outwardly from the wall of the sump well 13. A supporting strip 239, extends vertically a short distance above the bracket 235 and is secured to said other leg by welding. The fin 233 is secured to the supporting strip 239 by bolts 241.

As is best shown in FIG. 7, the valve 35 further comprises a valve housing 243 disposed beyond left-hand end of the main housing 231 with a wall 245 positioned therebetween. The interior of the main housing 231 is hollow and a diaphragm 249, having the outer edge thereof positioned between the wall 245 and said main housing, cooperates with said wall to provide a high pressure chamber 251 and with the housing 231 to provide a low pressure chamber 253. The main housing 231, diaphragm 249 and wall 245 are secured together by four bolts 255. The valve housing 243 is secured to the foregoing assembly by four stud bolts 255a.

The interior of the housing 243 (FIG. 7A) is divided into an inlet chamber 257 and an outlet chamber 259 for operating fluid, by a partition 261 in the center of which is threadably mounted a valve seat 263. A normally closed, balanced valve element 265, preferably formed of "Delrin," is movably supported in the outlet chamber 259 for cooperation with the seat 263, in order to govern the rate of bleed-flow of operating fluid through the control valve 35. The valve element 265 is floatingly supported for movement with respect to the seat 263 by an impervious, flexible rolling diaphragm 267, which has an inner margin that is clamped between a head portion 269 of the valve element and a tail portion 271, by a hollow screw 273 passing through a centrally disposed opening 274 formed in tail portion 271 and into a threaded opening 274a in the head portion 269.

An externally threaded sleeve 275, having a threaded bore 277 at its outer end, an intermediate counterbore 279, and a central opening 281 at its inner end, is mounted in a threaded opening 283 formed in the outer end of the housing 243. A tubular fitting 285 is mounted in the threaded portion 277 of the sleeve 275, with the inner portion 287 thereof disposed within the counterbore 279 and clamping the outer edge portion of the rolling diaphragm 267 between the inner end 289 thereof and a shoulder 291 at the bottom of the counterbore 279. A jam nut 292 on the fitting 285 maintains the sleeve 275 and said fitting in assembled relation.

The valve element 265 is spaced from the fitting 285 and is urged to seating position on the valve seat 263 by a compression spring 293, seated at one end on a shoulder 295 formed on the outer end of the tail portion 271 and at its other end on a thrust member 297 slidably mounted in a bore 299 in said fitting. The compression force in the spring 293 is maintained, and may be adjusted as desired, by a plug 302 threaded into the outer end of the bore 299, said plug having an inner conical end 304 seated in a cooperating recess formed in the thrust member 297. An O-ring seal 306 is mounted in a groove 308 formed near the inner end of the plug 302 to prevent the escape of fluid between the plug and fitting 285.

The valve element 265 is balanced against the fluid pressure in the inlet chamber 257, to which it is exposed through the opening in the valve seat 263, by providing passages 310 in its head 269, which communicate with a passage 312 extending axially through the screw 273. Fluid under pressure may flow from the inlet chamber 257 through the passages 310 and 312 in the valve element 265 to act with equal pressure on opposite sides of the valve. The rolling diaphragm 267 supports valve 265 for movement free from friction and improves the sensitivity of the valve to flow variations and adjustment. The diaphragm 249, which actuates valve 265, is provided at the center thereof with a flat-headed screw 314, disposed in the high pressure chamber 251 at the left side of the diaphragm, having a threaded portion 315 extending through an opening formed in the diaphragm. A supporting washer 316, having a threaded opening 318 at the center thereof, is mounted on the threaded portion 315 in the low pressure chamber 253, with diaphragm 249 tightly gripped between the head of screw 314 and the supporting washer 316. The diaphragm 249 is operatively connected with the element valve 265 by a rod 320 extending through the wall 245. A bushing 322, preferably formed of "Delrin," is pressed into an opening 324 formed in the wall 245, and slidably mounts the rod 320 in the bore 325 thereof, with one end of the rod in contact with the head of screw 314 and with the other end of the rod seated in a small depression 326 formed at the center of the head 269 of valve element 265.

In order to move diaphragm 249 to the left, as viewed in FIGS. 7 and 7A, and thus actuate valve element 265, a ball float 328 (FIG. 7B) is adjustably mounted on a float arm 330 by collars 327 and set screws 329. Referring now to FIGS. 7 and 8, the right-hand end of the main housing 231 has parallel, outwardly extending ear portions 332, having bushings 334 press-fitted into aligned openings 336 provided therein. A connector 338 having a transverse opening 340 extending therethrough, is disposed between the ears 332 and is mounted on a pivot pin 342, which extends through the opening 340 and into the aligned bushings 334. The threaded inner end 344 of the float arm 330 is mounted in a threaded opening 346 formed in the connector 338. A vertically extending rod 348, having a spherical head 350 at the lower end thereof and provided with screw threads 352 on the upper portion thereof, passes through the pivot pin 342 and is adjustably mounted in a threaded opening 356 extending through the connector 338 at right angles to the opening 340. The upper end of the rod 348 is provided with a square extension 358 for rotating and thereby vertically adjusting the rod in the connector 338. The rod 348 is maintained in adjusted position by a locknut 360 jammed against the upper surface of the connector 338. As is shown in FIG. 7B, the outer end of one of the ears 332 is cut away to provide stop surfaces 362 and 364, adapted to cooperate respectively with abutment surfaces 366 and 368 formed on a lug 370 extending outwardly from one side of the connector 338. The surfaces 364 and 368 are adapted to abut to limit the upward pivoting movement of the float arm 330, while the surfaces 362 and 366 abut to limit the downward pivoting movement of the float arm 330.

A bore 372 (FIG. 7) and a counterbore 374 are formed in the right-hand end of the main housing 231 in alignment with the spherical head 350 of the rod 348. An "Oilite" bearing 376 is pressed into the counterbore 374 and slidably mounts therein a piston 378, preferably formed of "Delrin." A thrust rod 380 is threadably mounted, as at 382, in the inner end of the piston 378, extends through a bushing 384 press-fitted into the bore 372, and projects into the low pressure chamber 253. The projecting end of the thrust rod 380 is seated in a recess 386 in one side of a thrust member 388. A compression spring 390 is seated at one end thereof against the diaphragm supporting washer 316 and at the other end thereof on a shoulder 392 formed on the other side of the thrust member 388. An O-ring seal 394 is mounted in a groove formed in the portion of the thrust rod 380 disposed within the bushing 384 to prevent the escape of fluid from the chamber 253.

The outer end 398 of the piston 378 extends beyond the right-hand end wall of the main housing 231, and engages the spherical head 350 on the rod 348 under the force of the compression spring 390. The central portion of the pivot pin 342 is cut away, as at 401 to provide ample clearance for the piston 378. The connector 338 is also cut away at 404 to clear the piston 378 and also to provide space for the spherical head 350. In order to protect the ears 332 supporting the pivot pin 342 and the outer end of piston 378 from contamination by foreign matter, these parts are protected by a rubber boot 403. One end of the boot 403 frictionally engages the float arm 330, while the other end is secured to the right-hand end of the main housing 231 by a spring-like fastener ring 405.

The rod 348 is adjustably mounted in pivot pin 342 and provides for adjusting the movement of valve 265 with respect to float arm 330. By adjusting the rod 348 upwardly in the pivot pin 342, the spherical head 350 will be moved closer to the pivot axis, thereby shortening the lever arm or radius of rotation of the spherical head 350. Alternatively, the rod 348 may be adjusted downwardly in the pivot pin 342 to increase the length of lever arm of the spherical head 350.

It will be seen that by varying the radial position of the spherical head 350 relative to its pivotal axis, the piston 378 will be moved a lesser or greater distance for a given angular travel of float arm 330. Thus, the extent of movement of the piston 378 can be varied without adjusting the ball float 328.

The water which is furnished to the pressure chamber 130 of the six inch automatic flow-control valve 29 through the pipe 164 to actuate said valve, flows from the T-shaped fitting 146 to the inlet chamber 257 of the float actuated control valve 35 through a pipe 407 connected at one end to a threaded opening 409 formed in the fitting 146, and connected at the other end thereof to a threaded opening 411 in the side of the housing 243 communicating with the inlet chamber 257. The outer chamber 259 of the float actuated control valve 35 vents directly to the sump well 13 through a short section of pipe 413 connected with an opening 412 (FIG. 6) in the opposite side of the housing 243.

In order to modulate the action of the float-actuated control valve 35, and thus vary the operation of the six inch main valve 29 in accordance with the flow rate through said main valve, a high pressure pipe 415 (FIGS. 11 and 12) is threadably connected at one end to a high pressure passage 417 formed in the orifice plate holder 174 on the upstream side of the orifice plate 190, and at the other end thereof to a passage 419 (FIG. 9) formed in the wall 245 of the control valve 35 in communication with high pressure chamber 251. The chamber 251 can be initially bled of air through a vent opening 251a normally closed by a screw 251b. A low pressure pipe 421 is connected at one end thereof to a downstream or low pressure passage 423, formed in the orifice plate holder 174 and at the other end thereof to a threaded opening 425 (FIG. 7) formed in the upper wall of main housing 231 of the control valve 35 in communication with the low pressure chamber 253.

As is illustrated in FIGS. 2, 4 and 5, the pipes 407, 415 and 421, which connect the main valves 29, 31 and 33 to the float-actuated control valves 35, 37 and 39 extend through suitable passages 427 formed in a wall 429 adjacent the upper edge thereof. Passages 427 are located above the uppermost limit 23 reached by the water in the sump well 13 in order to prevent such water from flowing into the pit P containing the main valves 29, 31 and 33.

As is shown in FIG. 4, control valve 35 is closed with the float 328 moved to the uppermost limit of movement thereof by the water at the high water level 23 in the sump well 13. With the float 328 in this uppermost position, the valve element 265 is biased into contact with the valve seat 263 by the spring 293, preventing the flow of operating fluid therethrough. As the float arm 330 moves downwardly in response to a lowering of the level of the water in the sump well 13, the rod 348 is pivoted with the pivot pin 342 to move the spherical head 350, formed at the lower end thereof, to the left, as viewed in FIG. 7, moving the piston 378 inwardly toward the valve element 265. The movement of the piston 378 is transmitted through the thrust rod 380, thrust member 388, compression spring 390, diaphragm 249 and rod 320 to the valve element 265, resulting in moving the said valve element from the seat 263 and opening the control valve to permit flow of operating fluid from the inlet chamber 257 to outlet chamber 259 of said control valve and into the sump well 13. Such opening of the conrtol valve permits operating fluid to bleed from the chamber 130 of the main valve 29 and allows the main valve to open.

The extent of movement of the valve element 265 with respect to the valve seat 263 by the float arm 330, as described, may be modulated by the differential in the pressures in the chambers 251 and 253 of the control valve, as communicated thereto from the sensing points of the orifice plate holder 174. An increase in the pressure in the chamber 251 and a decrease in the pressure in the chamber 253 results in compressing spring 390 and reducing the distance between the diaphragm 249 and the thrust member 388 which, in effect, shortens the operative connection between the float arm 330 and the valve element 265, thus providing for modulating the actuation of the control valve. A difference in pressure, as reflected by the pressure on opposite sides of the orifice 192 of the orifice plate 190, when water is flowing therethrough is conveyed to the chambers 251 and 253 through the respective high pressure sensing pipe 415 and low pressure sensing pipe 421 and modulates the action of the control valve 35. As the flow of water through orifice 192 increases, the pressure differential across the same will increase, and will result in an increase in the pressure in the chamber 251 of valve 35 and a decrease in the pressure in the chamber 253. This results in a closing movement of valve element 265 and a decrease in the rate of flow of operating fluid from the main valve 29 therethrough.

As mentioned above, the flow of water through the main valve 29 is controlled by varying the pressure in the pressure chamber 130. When the float-controlled pilot valve 35 is closed, the main valve 29 is also closed by the build-up of operating fluid pressure in the chamber 130 conducted thereto from the supply pipe 41 through the pipe 164, as previously described. The opening of the control valve 35, in response to a lowering of the level of the water in the reservoir 1, as reflected in the sump well 13, permits a portion of the operating fluid being supplied to pressure chamber 130 to bleed off at the fitting 146, reducing the pressure of the fluid in the pressure chamber 130. The pressure of the water in the inlet chamber 83 of the main valve will then overcome the pressure in the chamber 130 and the force of spring 126, effecting opening of the main valve 29 and permit water to flow through the valve and into the reservoir 1. The extent of opening of the control valve 35 governs the rate of flow of water through the main valve 29 by bleeding off more or less of the control pressure in the pressure chamber 130. So long as the main valve 29 is to remain open, the control valve 35 will bleed off operating fluid from the chamber 130 at least as fast as it is supplied thereto.

During the closing movement of main valve 29, the triangular-shaped flow control and dampening area 162 on opposite sides of the tubular restricter 136 provide a gradual increase in the restriction of flow of the operating fluid past the restricter as the valve approaches a closed position, thereby producing a dampening action and avoiding sudden to too rapid closing which would cause line surges.

The float control valve 35 is mounted on the bracket 235 on the wall 429 of the sump well 13 below the high water level 23 in such a manner that the float 328 will be moved to the upper limit of movement by the water at the high level 23, whereupon the control valve 265 will be closed. The float 328 may move downwardly, in response to a lowering of the water level in the sump well 13 from the high water level 23 to a lower level 431, a total distance of approximately 9½ inches to actuate the valve 265 from a closed to a fully open position.

The control valve 37 is laterally spaced from the valve 35 and is mounted on the wall 429 of the sump well 13 on a bracket 235 in the manner described above in connection with the valve 35, at a level approximately 9 inches lower than the valve 35. The control valve 39 is likewise mounted on the wall 429 directly below the control valve 35 at a level approximately 9 inches lower than control valve 37. The float arm of the control valve 39 is bent, as at 433, to position the float 328 attached thereto to laterally of the float attached to the control valve 35 to thus prevent possible contact between the two floats.

The control valve 37 remains closed until the water level in the sump well 13 drops approximately 9 inches to the water level 431. In the event that the level of the water falls below the level 431, the float of the control valve 37 lowers, thus opening the valve and actuating the 16 inch main valve 31 to augment the flow of water into reservoir 1. The control valve 37 will begin to open during approximately the last ½" of travel of the float of the control valve 35 as it approaches full open position. The control valve 37 will be fully open when the water in the sump well 13 is at the level 435. Should the water level drop below the level 435, the control valve 39 will come into operation to actuate the other 16 inch main valve 33 in the manner described above in connection with main valve 31 to augment the flow of water into the reservoir 1 through the main valves 29 and 31.

While the preferred embodiment of the invention is disclosed herein, it will be understood that various changes, alterations, modifications and equivalents which will occur to those skilled in the art may be made without departing from the principles of the invention as defined in the appended claims. It will also be understood that liquids, other than water can be controlled and caused to flow to and from tanks in the same manner described herein with respect to the reservoirs.

I claim:

1. A valve comprising: a housing having an inlet, an outlet and a valve element controlling the flow of fluid from said inlet to said outlet; a first means continuously, yieldably urging said valve element toward closed position; a second means continuously, yieldably urging said valve element toward open position, means active upon said second yieldable means to augment its opening action; and hydraulically operable means arranged to allow closing movement of said valve element, or to effect opening movement of said element independently of said second means.

2. A valve comprising: a housing having an inlet chamber, an outlet chamber and a valve element controlling the flow of fluid from said inlet to said outlet chamber; a first means in said housing yieldably urging said valve element toward closed position; a second means in said housing yieldably urging said valve element toward open position, including float-operated means active upon said second yieldable means; and hydraulically operable means in said housing to supplement the action of said float-operated means in urging said valve element toward open position, or to override said second yieldable means and permit said valve element to move toward closed position.

3. A valve, comprising: a housing having an inlet, an outlet and a valve element controlling the flow of fluid from said inlet to said outlet; a first spring yieldably urging said valve element toward closed position; hydraulically operable means in said housing operable to move said valve element to open position, or to permit said first spring to move said valve element to closed position; a second spring acting upon said hydraulically operable means, tending to urge the same to effect movement of said valve element to open position; and float-operated means effective upon said second spring for increasing the spring force tending to move said valve element toward open position, said hydraulically operable means being actuatable to overcome the force of said second spring means and to permit said first spring to move said valve element toward closed position.

4. In combination, a main valve: a control valve controlling the operation of said main valve including float-operated means for actuating said control valve; and means operable in accordance with the rate of flow of fluid through said main valve modulating the operation of said control valve independently of said float-operated means.

5. In combination, a fluid pressure operable main valve; a control valve connected with said main valve controlling the action of operating fluid thereon; means including an orifice plate located on the upstream side of said main valve; a control valve including a housing having an inlet chamber, an outlet chamber and a valve element for controlling the flow of fluid from said inlet to said outlet chamber; a first means in said housing yieldably urging said valve element toward closed position; a second means in said housing yieldably urging said valve element toward open position, including float-operated means active upon said second yieldable means; and hydraulically operable means in said housing responsive to the differential pressure across said orifice plate, arranged to supplement the action of said float-operated means in urging said valve element toward open position, or to overcome said second yieldable means and permit said valve element to move toward closed position.

6. In combination, a main valve comprising a housing having an inlet chamber, an outlet chamber, and a diaphragm for controlling the flow from said inlet chamber to said outlet chamber, and housing also having a pressure chamber for receiving operating fluid under pressure for actuating said diaphragm; means for continuously admitting operating fluid into said pressure chamber; a member including an orifice plate disposed on the inlet side of said main valve; a float-operated control valve connected with said pressure chamber of said main valve for controlling the bleeding of operating fluid from said pressure chamber, to thereby control the opening and closing of said main valve; float-operated means connected with said control valve controlling the opening and closing thereof, said control valve including means responsive to the differential pressure across said orifice plate; and means connecting said pressure differential responsive means with said orifice plate holder at sensing points on the opposite sides of said orifice plate, for modifying the action of the control valve produced by said float-operated means.

7. The combination defined in claim 6, in which the main valve includes restricter means controlling the flow of operating fluid into its pressure chamber to thereby govern the rate of closing of said main valve independently of said control valve.

8. A water supply system, comprising: a plurality of water storage reservoirs, each located at a different elevation; a water main for supplying water to an upper one of said reservoirs, and a water main interconnecting said one reservoir with at least one other of said plurality of reservoirs, each of said reservoirs having a pressure reducing station associated therewith including at least one fluid pressure operable main valve for controlling flow from a main to one reservoir; a sump well communicating with each reservoir and having at least one float-actuated control valve mounted therein responsive to variations in the water level in said sump well; means connecting said control valve with said main valve, said control valve being arranged to control the supply and exhaust of operating fluid to said main valve; and float-operated means connected with said control valve for controlling the opening and closing thereof, said control valve including means for modulating the action of said float-operated means in accordance with the rate of flow of water through the main valve.

9. A water supply system, comprising: a plurality of water storage reservoirs, each located at a different elevation; a water main for supplying water to an upper one of said reservoirs; a water main interconnecting said one reservoir with at least one other of said plurality of reservoirs, each of said reservoirs having a pressure-reducing station associated therewith including a plurality of fluid pressure operable main valves, each connected with a common supply main for controlling flow to one of said reservoirs; a sump well communicating with each reservoir and having a separate float-actuated control valve mounted therein responsive to variations in the water level in said sump well for controlling a different one of said main valves, said float-actuated control valves being mounted at different levels in said sump well; conduit means connecting each of said control valves with one of said main valves, said control valves being arranged to control the supply and exhaust of operating fluid to its associated main valve; float-actuated means connected with each control valve for actuating the same as the liquid level in the sump well varies, each control valve including means for modulating the action of said float-operated means, in accordance with the rate of flow of water through its associated main valve.

10. A water supply system as defined in claim 9, wherein each main valve has an orifice plate on the inlet side thereof, and wherein the means for modulating the action of the float-operated means includes means responsive to the differential pressure across said orifice plate, and conduit means connecting said modulating means with sensing points on opposite sides of said orifice plate.

11. A float-actuated valve for controlling a fluid pressure operable main valve and for modulating and governing the rate of flow of operating fluid therethrough, comprising: a housing having inlet and outlet chambers for the flow of operating fluid therethrough, a normally closed valve element movable to govern the rate of flow of operating fluid from said inlet chamber to said outlet chamber; a flexible diaphragm in said housing providing a closed, high pressure sensing chamber and a closed, low pressure sensing chamber; means operatively interconnecting said valve element and said diaphragm; a float-actuated means arranged to deflect said diaphragm to actuate said valve element; and means for connecting said high and low pressure sensing chambers to respective high and low pressure sensing areas at the inlet side of a main valve, whereby said diaphragm will actuate said valve element in response to the deflection of the diaphragm produced by the differential pressure effective thereon and modulate the deflection of the diaphragm produced by said float-actuated means.

12. A float-actuated valve as defined in claim 11, in which an increase in the pressure differential in said sensing pressure chamber deflects said diaphragm in a direction to move said valve element toward closed position.

13. A float-actuated valve as defined in claim 11, in which said valve element is hydraulically balanced, and wherein resilient means urge said valve element toward closed position.

14. A float-actuated valve, as defined in claim 11, in which the float means includes a float arm movable between fixed upper and lower angular limits; and adjustable means actuated by said float arm for varying the extent of deflection of said diaphragm upon movement of said float arm between said upper and said lower limits.

15. A float-actuated valve as defined in claim 14, wherein the adjustable means includes a rod having a head engaged with a piston, and wherein the effective lever length of said rod can be varied.

16. A float-actuated valve as defined in claim 15, wherein the adjustable rod has its axis intersecting with the pivotal axis of an arm connected with the float means.

References Cited by the Examiner

UNITED STATES PATENTS

| | | | |
|---|---|---|---|
| 745,351 | 12/03 | Hungerford | 137—236 |
| 930,903 | 8/09 | Tucker | 137—236 |
| 2,854,994 | 10/58 | Glasgow | 137—414 |
| 2,855,949 | 10/58 | Sterner et al. | 137—414 |

WILLIAM F. O'DEA, *Primary Examiner.*

UNITED STATES PATENT OFFICE
CERTIFICATE OF CORRECTION

Patent No. 3,205,907 September 14, 1965

James Robert Reese

It is hereby certified that error appears in the above numbered patent requiring correction and that the said Letters Patent should read as corrected below.

Column 7, line 48, for "lower" read -- longer --; column 11, line 22, for "conrtol" read -- control --; column 13, line 46, for "and" read -- said --; column 14, line 67, for "chamber" read -- chambers --.

Signed and sealed this 17th day of May 1966.

(SEAL)
Attest:

ERNEST W. SWIDER
Attesting Officer

EDWARD J. BRENNER
Commissioner of Patents